(12) United States Patent
Ahmed et al.

(10) Patent No.: US 11,159,487 B2
(45) Date of Patent: Oct. 26, 2021

(54) AUTOMATIC CONFIGURATION OF PERIMETER FIREWALLS BASED ON SECURITY GROUP INFORMATION OF SDN VIRTUAL FIREWALLS

(71) Applicant: Juniper Networks, Inc., Sunnyvale, CA (US)

(72) Inventors: Tayib Ahmed, Bangalore (IN); Arulraj S, Bangalore (IN); Muthukrishnan Gurusamy, Bangalore (IN); Kavya Naik K, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 310 days.

(21) Appl. No.: 16/286,190

(22) Filed: Feb. 26, 2019

(65) Prior Publication Data
US 2020/0274852 A1 Aug. 27, 2020

(51) Int. Cl.
*H04L 29/06* (2006.01)
*H04L 12/24* (2006.01)

(52) U.S. Cl.
CPC ...... *H04L 63/0263* (2013.01); *H04L 41/0816* (2013.01); *H04L 41/0893* (2013.01); *H04L 63/0218* (2013.01); *H04L 63/104* (2013.01); *H04L 63/20* (2013.01)

(58) Field of Classification Search
CPC ............. H04L 63/0263; H04L 41/0816; H04L 41/0893; H04L 63/0218; H04L 63/104; H04L 63/20
See application file for complete search history.

(56) References Cited

U.S. PATENT DOCUMENTS

| | | | |
|---|---|---|---|
| 9,106,693 B2 | 8/2015 | Quinlan et al. | |
| 10,135,841 B2 | 11/2018 | Beam et al. | |
| 10,484,334 B1* | 11/2019 | Lee | H04L 63/0245 |
| 10,728,121 B1* | 7/2020 | Chitalia | H04L 41/12 |
| 2017/0005986 A1 | 1/2017 | Bansal et al. | |
| 2017/0223060 A1* | 8/2017 | Hayes | H04L 63/164 |
| 2018/0359255 A1* | 12/2018 | Stair | H04L 63/0227 |

(Continued)

OTHER PUBLICATIONS

Extended Search Report from counterpart European Application No. 19180814.6, dated Jan. 7, 2020, 8 pp.

(Continued)

*Primary Examiner* — Oleg Korsak
(74) *Attorney, Agent, or Firm* — Shumaker & Sieffert, P.A.

(57) ABSTRACT

Techniques are described for configuring a one or more perimeter firewalls positioned on the perimeter of a data center based on security group information associated with an internal virtual firewall operating within one or more software defined networks (SDN) within the data center. For example, a Security Management System (SMS) may access a centralized network controller (CNC) for an SDN within the data center to obtain security group information for a virtual firewall of the SDN, wherein the security group information specifies a cluster of virtual machines of the software defined network that is protected by the virtual firewall; and automatically configuring, with the SMS, a perimeter firewall positioned on the edge of the data center with one or more security policies based on the security group information from the virtual firewall of the SDN.

15 Claims, 4 Drawing Sheets

(56) References Cited

U.S. PATENT DOCUMENTS

2019/0182213 A1\* 6/2019 Saavedra ............ H04L 63/0236

OTHER PUBLICATIONS

Enns, "NETCONF Configuration Protocol," RFC 4741, Network Working Group, the Internet Engineering Task Force, Dec. 2006, 95 pp.

Harrington et al., "An Architecture for Describing Simple Network Management Protocol (SNMP) Management Frameworks," RFC 3411, Network Working Group, the Internet Engineering Task Force draft, Dec. 2002, 64 pp.

Response to Extended Search Report dated Jan. 7, 2020 from counterpart European Application No. 19180814.6, filed Mar. 1, 2021, 14 pp.

Notice of Intent to Grant and Text Intended to Grant from counterpart European Application No. 19180814.6, dated Apr. 19, 2021, 31 pp.

\* cited by examiner

AUTOMATIC CONFIGURATION OF PERIMETER FIREWALLS BASED ON SECURITY GROUP INFORMATION OF SDN VIRTUAL FIREWALLS

TECHNICAL FIELD

This disclosure generally relates to computer networks and, more particularly, to configuring firewall policies.

BACKGROUND

In a typical cloud data center environment, there is a large collection of interconnected servers that provide computing and/or storage capacity to run various application. For example, a data center may comprise a facility that hosts applications and services for subscribers, i.e., customers of the data center. The data center may, for example, host all of the infrastructure equipment, such as networking and storage systems, redundant power supplies, and environmental controls. In a typical data center, clusters of storage systems and application servers are interconnected via a switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, such as virtual machines or containers, are deployed and executed on an underlying compute platform of physical computing devices. In some examples, the infrastructure may include a combination of the physical devices, which may be referred to as the "underlay resources," that are linked to and communicate with a variety of virtual resources such as virtual servers, agents, and/or policy controllers, which may be referred to as "overlay resources."

Security devices, such as firewalls, provide network security for a data center. Firewalls may include virtual firewalls or physical firewalls. A virtual firewall, such as a firewall hosted on a virtual machine, provides network security for network traffic flowing in a virtual network. A physical firewall, such as a firewall implemented on hardware, provides network security for network traffic flowing in a physical network. Different vendors may provide the security devices, which may in some instances provide network security for different layers of the Open System Interconnection (OSI) model.

SUMMARY

In general, the disclosure describes techniques for configuring one or more perimeter firewalls positioned on the edge of a data center based on security group information associated with an internal virtual firewall operating within one or more software defined networks (SDNs) within the data center. For example, a first entity may provide a centralized network controller (CNC) (e.g., an SDN controller) to facilitate operation of one or more virtual networks (i.e., the software defined network) within a data center. More specifically, a user may use CNC to manage a virtual firewall and virtual machines executing on one or more compute nodes (e.g., servers) of the data center. The CNC is used to define security group information that defines a cluster of virtual machines to be protected by one or more security policies implemented by the virtual firewall. The virtual firewall provides network security for a virtual network of the data center, such as traffic flowing between the cluster of virtual machines (referred to herein as "east-west" traffic) within the data center. A second entity may provide a perimeter firewall positioned on the edge of the data center that provides network security for a physical network of the data center, such as traffic ingressing and/or egressing the data center (referred to herein as "north-south" traffic). According to the techniques described in this disclosure, the configuration of the perimeter firewall may leverage the security group information that was configured for the virtual firewall to extend network security to the perimeter level of the data center.

One example of the techniques disclosed herein includes a security management system of the second entity that is used for the creation, maintenance, and application of network security policies for the perimeter firewall. The security management system may interface with the CNC of the first entity to obtain the security group information configured for the virtual firewall. The security management system may map the security group information as address group information and create firewall policies that use the address group information. The security management system publishes the firewall policies to the perimeter firewall such that the perimeter firewall may provide network security for traffic flowing between the cluster of virtual machines identified from the security group information and a device external to the data center. In this way, security group information configured for a virtual firewall to provide network security for east-west traffic for a cluster of virtual machines can be leveraged to configure a perimeter firewall to provide network security for north-south traffic for the cluster of virtual machines.

In one example, one or more aspects of the techniques described herein include a method comprising: accessing, with a security management system of a data center, a centralized network controller for a software defined network within the data center to obtain security group information for a virtual firewall of the software defined network, wherein the security group information specifies a cluster of virtual machines of the software defined network that is protected by the virtual firewall that provides network security for traffic flowing between applications executing on the cluster of virtual machines; and automatically configuring, with the security management system, a perimeter firewall positioned on the edge of the data center with one or more security policies based on the security group information from the virtual firewall of the software defined network, wherein the physical firewall provides network security for traffic flowing between the software defined network and devices external to the data center.

In another example, one or more aspects of the techniques described herein include a security management system of a data center configured to: access a centralized network controller for a software defined network within the data center to obtain security group information for a virtual firewall of the software defined network, wherein the security group information specifies a cluster of virtual machines of the software defined network that is protected by the virtual firewall that provides network security for traffic flowing between applications executing on the cluster of virtual machines; and automatically configuring, with the security management system, a physical firewall positioned on the edge of the data center with one or more security policies based on the security group information from the virtual firewall of the software defined network, wherein the physical firewall provides network security for traffic flowing between the software defined network and devices external to the data center.

In yet another example, one or more aspects of the techniques described herein include a non-transitory computer-readable medium that comprises instructions that, when executed, cause one or more processors of a data center executing a Security Management System (SMS) to: access a centralized network controller for a software defined network within the data center to obtain security group information for a virtual firewall of the software defined network, wherein the security group information specifies a cluster of virtual machines of the software defined network that is protected by the virtual firewall that provides network security for traffic flowing between applications executing on the cluster of virtual machines; and automatically configuring, with the security management system, a physical firewall positioned on the edge of the data center with one or more security policies based on the security group information from the virtual firewall of the software defined network, wherein the physical firewall provides network security for traffic flowing between the software defined network and devices external to the data center.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
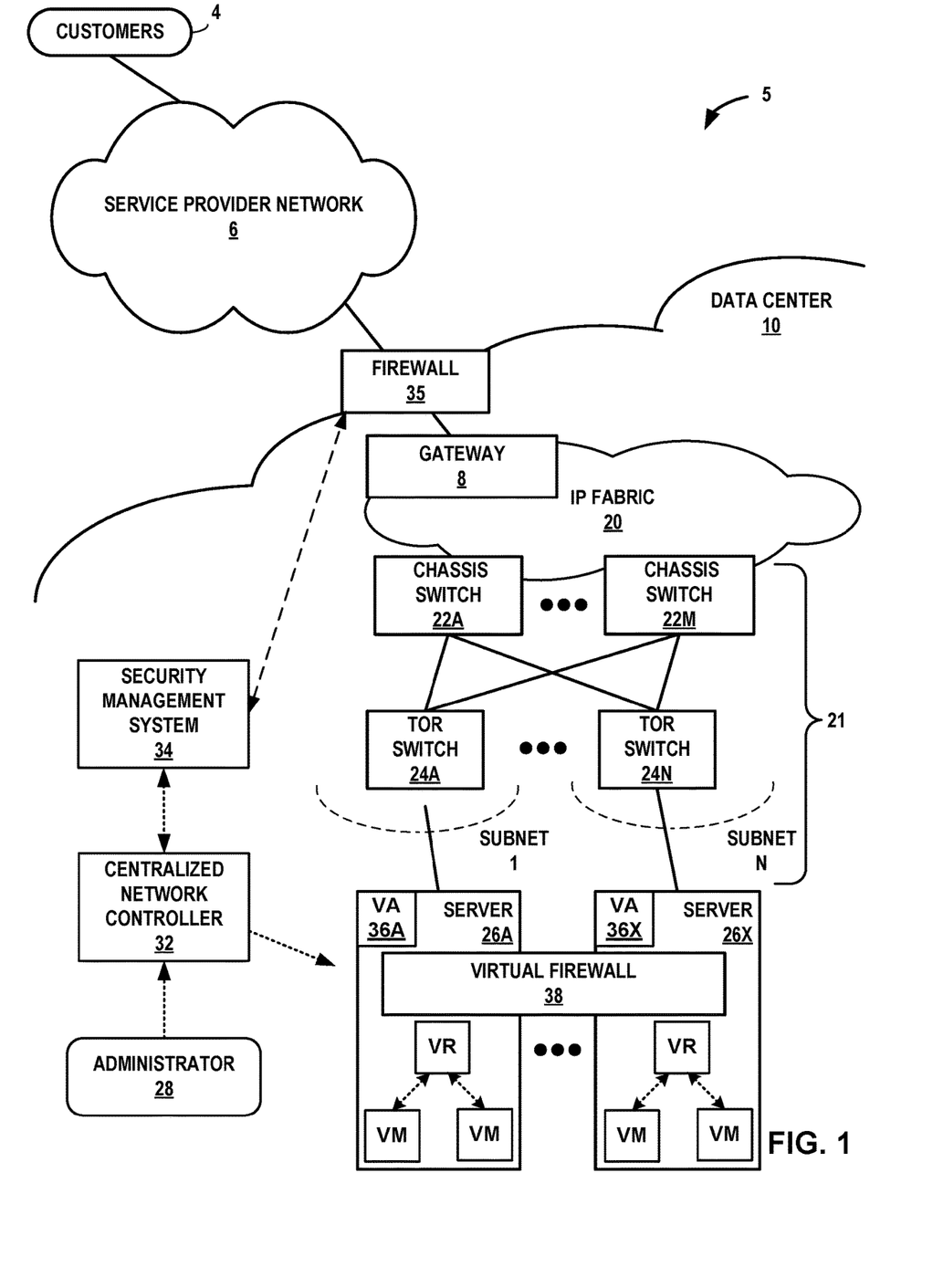
FIG. 1 is a block diagram illustrating an example network having a data center in which examples of the techniques described herein may be implemented.

FIG. 1 is a block diagram illustrating an example network 5 having a data center 10 in which examples of the techniques described herein may be implemented. In general, network 5 includes a data center 10 that provides an operating environment for applications and services for customers 4 coupled to the data center 10 by service provider network 6. Data center 10 hosts infrastructure equipment, such as networking and storage systems, redundant power supplies, and environmental controls. Service provider network 6 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 is a facility that provides network services for customers 4. Customers 4 may be collective entities such as enterprises and governments or individuals. A network data center may host web services for several enterprises and end users. Other example services may include data storage, virtual private networks, traffic engineering, file service, data mining, scientific- or super-computing, and so on. In some examples, data center 10 is an individual network server, a network peer, or otherwise.

In this example, data center 10 includes a set of storage systems and application servers interconnected via high-speed switch fabric 21 provided by one or more tiers of physical network switches and routers. Servers 26A-26X ("servers 26") function as compute nodes of the data center. In some examples, the terms "compute nodes" and "servers" are used interchangeably herein to refer to servers 26. For example, each of servers 26 may provide an operating environment for execution of one or more customer-specific virtual machines ("VMs" in FIG. 1). As one example, servers 26 may provide an infrastructure, e.g., ESX/ESXi of VMware, that supports virtualization capabilities that aggregate and present the host hardware to virtual machines as a normalized set of resources.

Switch fabric 21 is provided by a set of interconnected top-of-rack (TOR) switches 24A-24N (collectively, "TOR switches 24") coupled to a distribution layer of chassis switches 22A-22M (collectively, "chassis switches 22"). Although not shown, data center 10 may also include, for example, one or more non-edge switches, routers, hubs, gateways, servers, computer terminals, laptops, printers, databases, wireless mobile devices such as cellular phones or personal digital assistants, wireless access points, bridges, cable modems, application accelerators, or other network devices.

In the example FIG. 1, TOR switches 24 and chassis switches 22 provide servers 26 with redundant (multi-homed) connectivity to IP fabric 20. Chassis switches 22 aggregate traffic flows and provides high-speed connectivity between TOR switches 24. TOR switches 24 are network devices that provide layer two (e.g., MAC) and/or layer 3 (e.g., IP) routing and/or switching functionality. TOR switches 24 and chassis switches 22 each include one or more processors and a memory, and that are capable of executing one or more software processes. Chassis switches 22 are coupled to IP fabric 20, which performs layer 3 routing to route network traffic between data center 10 and customers 4 by service provider network 6. Gateway 8 acts to forward and receive packets between IP fabric 20 and service provider network 6.

Centralized Network Controller 32 ("CNC") provides a centralized controller for facilitating operation of one or more virtual networks within data center 10 (i.e., the software defined network within data center 10). In some examples, CNC 32 operates in response to configuration input received from administrator 28. CNC 32 manages functions of data center 10 such as compute, storage, networking, networking services (e.g., security), and application resources. For example, CNC 32 may create a virtual network for a tenant within data center 10 or across data centers. CNC 32 may attach virtual machines to a tenant's virtual network. CNC 32 may connect a tenant's virtual network to some external network, e.g. the Internet or a VPN.

In some examples, CNC 32 is provided by a first entity, such as VMware. In this example, CNC 32 may, for example, represent NSX Manager associated with a vCenter server provided by VMware. CNC 32 is installed as a virtual appliance on any host (e.g., servers 26) in data center 10. In the example of FIG. 1, CNC 32 manages servers 26 that provide an operating environment, e.g., ESX/ESXi of VMware, also provided by the first entity for execution of one or more customer-specific virtual machines.

Typically, the traffic between any two network devices, such as between network devices within IP fabric 20 (not shown) or between servers 26 and customers 4 or between servers 26, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF)X RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As described herein, each of servers 26 include a respective virtual router ("VR" in FIG. 1) that executes multiple routing instances for corresponding virtual networks within data center 10 and routes the packets to appropriate virtual machines executing within the operating environment provided by the servers. Packets received by the virtual router of server 26A, for instance, from the underlying physical network fabric may include an outer header to allow the physical network fabric to tunnel the payload or "inner packet" to a physical network address for a network interface of server 26 that executes the virtual router. The outer header may include not only the physical network address of the network interface of the server but also a virtual network identifier such as a VxLAN tag or Multiprotocol Label Switching (MPLS) label that identifies one of the virtual networks as well as the corresponding routing instance executed by the virtual router. An inner packet includes an inner header having a destination network address that conform to the virtual network addressing space for the virtual network identified by the virtual network identifier.

In the example of FIG. 1, CNC 32 learns and distributes routing and other information (such as configuration information) to all compute nodes in the data center 10. The VR agent 36 running inside the compute node, upon receiving the routing information from CNC 32, typically programs the data forwarding element (virtual router) with the forwarding information. CNC 32 sends routing and configuration information to the VR agent 36. CNC 32 acts as a messaging protocol client when receiving virtual routes from a VR agent 36, and the VR agent 36 acts as a messaging protocol server in that case. Conversely, CNC 32 acts as a messaging protocol server to the VR agent 36 as the messaging protocol client when the CNC 32 sends routes to the VR agent 36.

CNC 32 may also implement and manage at least one virtual firewall 38 to provide network security for traffic flowing within a software defined network (SDN) internally managed within the data center 10. For example, CNC 32 may configure and push security policies to virtual firewall 38 to provide network security for network traffic flowing between applications executing on virtual machines of servers 26, which is referred to herein as "east-west" traffic, of an SDN network within data center 10.

Virtual firewall 38, for instance, may represent a distributed firewall executing on computing platforms provided by multiple servers or appliances. For example, the virtual firewall may be a hypervisor kernel-embedded firewall that provides network security for VMs. Virtual firewall 38 is configured in each hypervisor of servers 26 (e.g., ESX provided by VMware). Because each of servers 26 is connected to a hypervisor, by consequence, each virtual server is directly connected to an omnipresent firewall.

A user may use CNC 32 to configure security group information that assign resources, such as virtual machines, that are to be protected by virtual firewall 38. Security group information may represent one or more containers that contain multiple object types, including logical switches, virtual network interface controllers (vNIC), IPsets, and virtual machines.

Typically, security group information may include dynamic membership criteria based on security tags, VM name or logical switch name. By configuring dynamic membership criteria, CNC 32 may apply a security policy to a cluster of VMs associated with the dynamic membership criteria. For example, VMs of servers 26A and 26X may have a security tag of "web." CNC 32 may configure a security policy for a security group having a security tag of "web," and may push the security policy to virtual firewall 38 to apply the security policy to VMs associated with the "web" security tag. By applying security policies to security groups instead of individual network addresses, virtual firewall 38 may dynamically apply the security policies to a group of virtual machines regardless if the virtual machines change locations. For example, when one or more virtual machines of the security group moves to a different server or data center, the virtual machine may have a different virtual network address. But since the virtual machine retains the "web" security tag, the virtual machine will still be protected by the virtual firewall 38. That is, the security policies do not have to be reconfigured each time a virtual machine changes location. Although the techniques described in this disclosure are described with respect to security group information specific to VMware, the security group information may represent any information from any vendor that defines a cluster of virtual machines for which to provide network security for a virtual network.

Data center 10 includes a perimeter security device, e.g., perimeter firewall 35, positioned on the edge of data center 10 to provide network security for traffic ingressing and/or egressing data center 10, otherwise referred to as "north-south" traffic. In the example of FIG. 1, perimeter firewall 35 represents a physical firewall that enforces each firewall policy at a port and protocol level. Although illustrated and described as a physical firewall, perimeter firewall 35 may be a virtual firewall that provides security at the edge of data center 10. In some examples, perimeter firewall 35 enforces each firewall policy at a OSI Layer 7 application level (e.g., Hyper Text Transfer Protocol (HTTP) traffic may be permitted while Secure Socket Layer (SSL) traffic is blocked). In some examples, each firewall policy defines a plurality of network traffic rules. In some examples, perimeter firewall 35 may block traffic based on 5-tuple rules (e.g., a Layer 3 or Layer 4 firewall), based on an Access Control List (ACL), or based on 5-tuples and an application identifier (ID) or signature (e.g., a Layer 7 firewall).

Perimeter firewall 35 may in some instances be provided by a second entity. In these examples, the second entity may provide perimeter firewall 35 that includes security services not provided by perimeter firewalls provided by the first entity (e.g., L4 through L7 security services). Perimeter firewall 35 may implement sophisticated security rules to permit or block network traffic external to data center 10 before the network traffic enters data center 10. In the example of FIG. 1, perimeter firewall 35 is positioned on an external side of gateway 8, e.g., between gateway 8 and upstream routers of a network external to data center 10, such as service provider network 6. In other examples, gateway 8 may include the firewall functionality of perimeter firewall 35 and perform the techniques described herein. Perimeter firewall 35 performs packet forwarding and packet filtering services for data center 10. Perimeter firewall 35 may in some examples be a perimeter firewall component that comprises hardware or a combination of hardware and software.

The security management system 34 provided by the second entity may configure and manage perimeter firewall 35. Security management system 34 may configure security policies having one or more network traffic rules. Each network traffic rule may include at least one source IP address, at least one source port, at least one destination IP address, at least one destination port, a protocol, may specify whether or not the network traffic rule is application-based, a direction (e.g., ingress or egress traffic), and may further specify pattern matching rules (e.g., regular expressions). In some examples, the network traffic rule may further specify a corresponding permission action for network traffic originating from the source and destined for the destination (e.g., block the traffic, allow the traffic, log the traffic, or report the traffic to an administrator).

In some examples, the source of the network traffic and destination of the network traffic are represented by one or more network addresses and/or one or more subnets. For example, based on the firewall policies, perimeter firewall 35 may block or permit the network traffic flowing between one or more applications executing on virtual machines of servers 26 and devices external to data center 10. For example, based on a first firewall policy, perimeter firewall 35 may block network traffic originating from one or more addresses external to data center 10 and destined for the one or more applications within data center 10. As a further example, based on a second firewall policy, perimeter firewall 35 may allow network traffic originating from one or more addresses external to data center 10 and destined for the one or more applications within data center 10. As a further example, based on a third firewall policy, perimeter firewall 35 may block network traffic originating from the one or more applications within data center 10 and destined for one or more addresses external to data center 10. As a further example, based on a fourth firewall policy, perimeter firewall 35 may allow network traffic originating from the one or more applications within data center 10 and destined for one or more addresses external to data center 10.

With different vendors providing management and configuration for virtual firewall 38 and perimeter firewall 35, respectively, the perimeter firewall is typically unaware of the configuration information of the virtual firewall. In accordance with the techniques described in this disclosure, perimeter firewall 35 is configured based on security group information configured for virtual firewall 38 to extend network security for "north-south" traffic of the VMs identified in the security group information.

As one example, security management system 34 may obtain from CNC 32 security group information specifying a cluster of virtual machines protected by virtual firewall 38. In the example of FIG. 1, administrator 28 uses CNC 32 to define the security group information that specifies, for example, a cluster of VMs of servers 26, and in some instances, a dynamic member criteria, e.g., a security tag (or VM name/logical switch name), associated with the cluster of VMs that are to be protected by virtual firewall 38.

Security management system 34 is configured to interface with CNC 32 to obtain the security group information. For example, security management system 34 may discover, register, and add CNC 32 as a device in which to exchange information. CNC 32 may synchronize shared objects, e.g., security group information, and addresses with security management system 34. Security management system 34 maps the security group information as address group information stored within a repository of security management system 34. Security management system 34 may automatically construct one or more security policies to use the address group information and in a syntax that conforms to the requirements of the perimeter firewall 35. For example, using the address group information, security management system 34 may define one or more rules for traffic ingressing into data center 10 and destined for one or more VMs associated with the address group, and/or for traffic egressing from the one or more VMs associated with the address group and egressing data center 10. In this way, perimeter firewall 35 may apply the one or more security policies for the cluster of VMs originally identified from the security group information. In some examples, security management system 34 may obtain the security group information periodically or in the event the security group information changes (e.g., group membership changes). In this way, security management system 34 is updated with any membership changes to the security group. In further examples, security management system 34 may monitor membership changes to a subset of the security groups. For an example in which CNC 32 configures a large number of security groups, security management system 34 may monitor for any membership changes to a subset of the security groups. In this way, security management system 34 may more efficiently monitor membership changes to a smaller subset of security groups without being overloaded with changes to the entire set of security groups.

Security management system 34 may push the one or more configured security policies to perimeter firewall 35 such that perimeter firewall 35 may apply the security policies at the perimeter level of data center 10. That is, perimeter firewall 35 may apply the security policies for the cluster of VMs originally identified in the security group information.

The techniques may provide one or more example technical advantages. For example, by obtaining security group information configured for a virtual firewall and configuring a perimeter firewall based on the security group information, the network security for the virtual network is bridged with the network security for the physical network. Moreover, by implementing the techniques described herein, a perimeter firewall may dynamically apply security policies for a security group regardless of whether the virtual machines have changed location.

Figure 2:
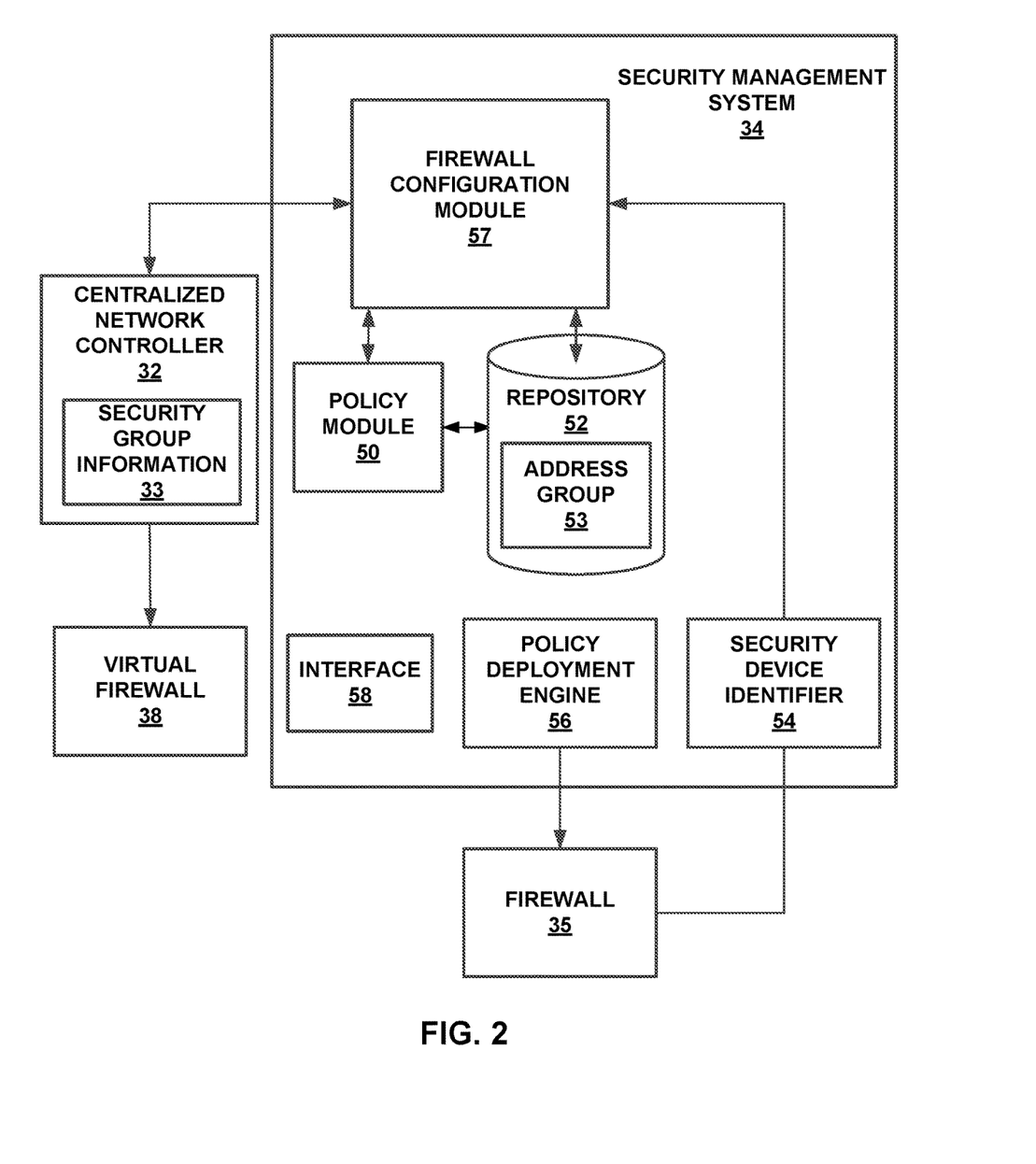
FIG. 2 is a block diagram illustrating an example security management system, in accordance with the techniques described in this disclosure.

FIG. 2 is a block diagram illustrating an example security management system 34 of FIG. 1 in greater detail. As described herein, security management system 34 provides a system to configure one or more security policies of perimeter firewall 35 based on security group information obtained from centralized network controller 32. In FIG. 2, for example, firewall configuration module 57 that executes on one or more processors (not shown in FIG. 2) of security management system 34 may interface with centralized network controller 32 to obtain security group information 33 identifying a cluster of VMs protected by virtual firewall 38. For example, a user may interface with firewall configuration module 57 via interface 58 to select CNC 32 for which firewall configuration module 57 may initiate communication with to enable bidirectional communication to exchange information, e.g., security group information 33.

Firewall configuration module 57 may use Secure Sockets Layer (SSL) to communicate on a TCP port (not shown in FIG. 2) with centralized network controller 32. In some aspects, firewall configuration module 57 may periodically obtain security group information 33 or obtain security information 33 when membership of the security group information 33 (or a subset of security group information) changes.

In response to obtaining security group information 33, firewall configuration module 57 may map the security group information 33 to an address group 53 within repository 52. Repository 52 may represent a database or other data repository that is located internally or externally to security management system 34. Address group 53 may serve as a container for a list of network addresses propagated from an external data feed, and can be used by a security policy. For example, in response to obtaining the security group information 33 from CNC 32, firewall configuration module 57 may map the dynamic membership criteria from security group information 33 to address group 53.

Security management system 34 may include a security device identifier 54 that identifies the security devices for which security management system 34 is to manage and configure. For example, security device identifier 54 may identify perimeter firewall 35 as a security device for which firewall configuration module 57 may construct one or more security policies. In some examples, security device identifier 54 may automatically discover all security devices coupled to security management system 34. In other examples, an administrator may interface with security management system 34 via interface 58 to provide details of all the security devices for which security device identifier 54 may discover.

Security management system 34 may include a policy module 50 that executes on one or more processors (not shown in FIG. 2) of security management system 34, wherein the policy module 50 may generate advanced security service policies (e.g., application firewall policy (L7)) to be implemented on security devices identified by security device identifier 54. For example, firewall configuration module 57 may use policy module 50 to define set of statements (e.g., rules) for a security device, e.g., perimeter firewall 35, that controls traffic from a specified source to a specified destination using a specified service. For traffic ingressing the data center and destined for the cluster of VMs identified from the security group information, policy module 50 may automatically construct, for example, a destination address field of a security policy to use an entry of the address group 53 that identifies the cluster of VMs. For traffic egressing the data center and sourced from the cluster of VMs identified from the security group information, policy module 50 may automatically construct, for example, a source address field of a security policy to use an entry of the address group 53 that identifies the cluster of VMs. In essence, by configuring the source and destination address fields of security policies to use address group 53, the security policies are generated to control the "north-south" traffic to/from the cluster of VMs identified from security group information 33.

In response configuring the one or more security policies, firewall configuration module 57 may direct policy deployment engine 56 to deploy the configured one or more security policies to perimeter firewall 35. In general, the underlying policy deployment engine 56 of security management system 34 may use one or more network management protocols designed for management of configuration information data within managed perimeter firewall 35, such as the Simple Network Management Protocol (SNMP) protocol or the Network Configuration Protocol (NETCONF) protocol or a derivative thereof, such as the Juniper Device Management Interface, to manage the security policies within perimeter firewall 35. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference. NETCONF is described in R. Enns et al., RFC 4741: "NETCONF Configuration Protocol," Network Working Group, the Internet Engineering Task Force draft, December 2006, available at http://tools.ietf.org/html/rfc4741, which is incorporated herein by reference in its entirety. Using the network management protocol, security management system 10 may establish configuration sessions with one or more security devices that allow security management system 10 to traverse and modify configuration information data within the one or more security devices, such as perimeter firewall 35.

Security management system 34 includes an interface 58, such as a graphical user interface, to access the modules described above. For example, a user may access firewall configuration module 57 via interface 58 to add new rules to perimeter firewall 35 view servers (e.g., servers 26 of FIG. 1) managed by CNC 32, to view security group information such as security group members (e.g., VMs that are part of the security group)

Figure 3:
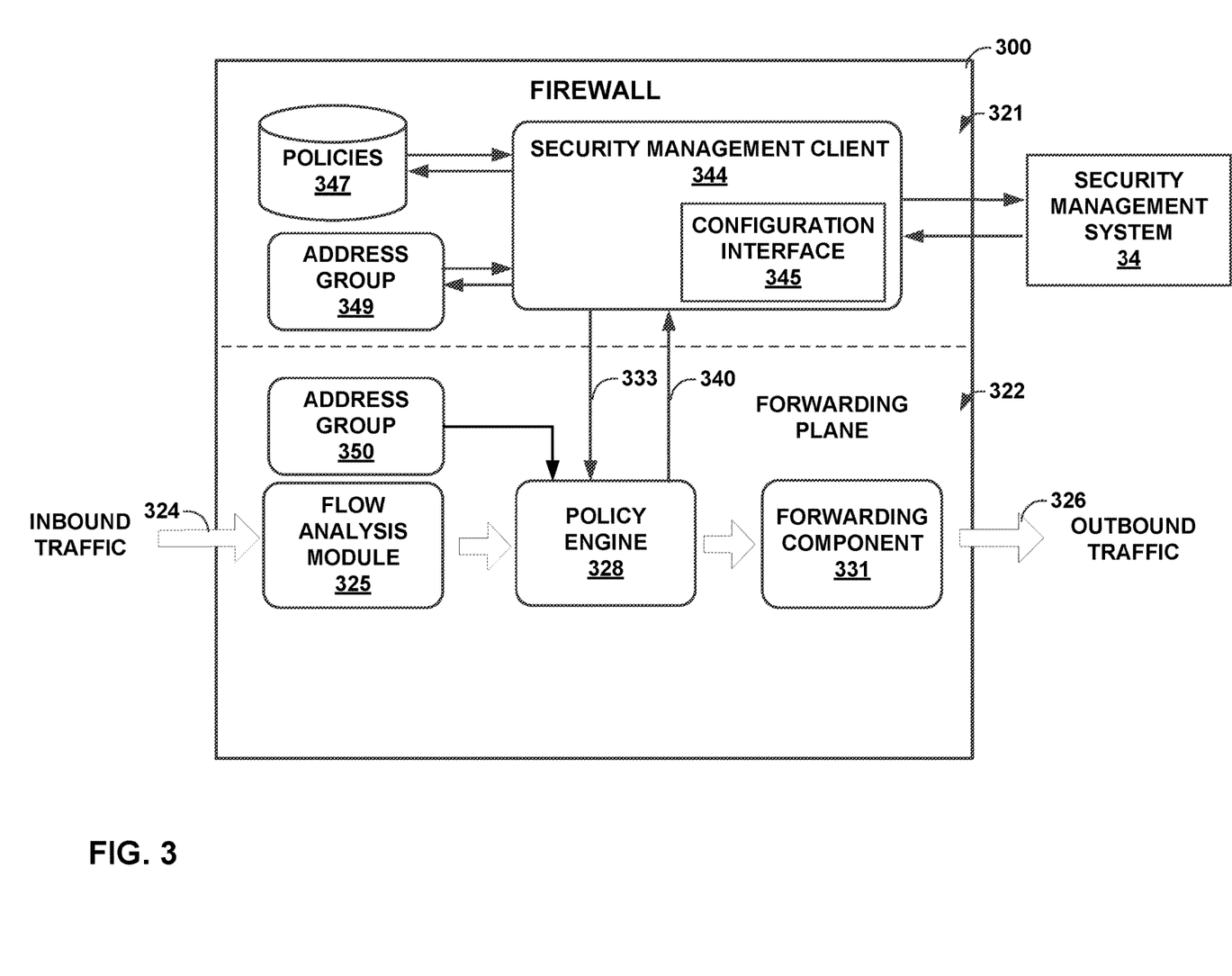
FIG. 3 is a block diagram illustrating an example physical firewall, in accordance with the techniques of this disclosure.

FIG. 3 is an example perimeter firewall, in accordance with the techniques described herein. Perimeter firewall 300 may represent perimeter firewall 35 of FIGS. 1 and 2 in greater detail. As described below, perimeter firewall 300 is positioned at the edge of the data center and processes network packet flows ingressing and egressing the data center and performs deep packet inspection on packet flows to identify potential network threats to a cluster of virtual machines originally identified from security group information, in one aspect of this disclosure.

In the illustrated example, perimeter firewall 300 includes a control plane 321 that manages the control plane functions for the firewall and forwarding plane 322 that transparently monitors inbound network traffic 324 and forwards the network traffic as outbound network traffic 326. In the example illustrated by FIG. 3, forwarding plane 322 includes flow analysis module 325, policy engine 328, address group information 350, and forwarding component 331.

Control plane 321 may run on a routing engine (not shown in FIG. 3) that includes a security management client 344 that provides a configuration interface 345 for communicating with security management system 34 in accordance with one or more device configuration protocols (e.g., SNMP). For example, security management client 344 may receive one or more security policies from security management system 34 via configuration interface 345 and store the security policies in a policies database, e.g., policies 347. As further described below, the security policies received from security management system 34 may use an address group identifying a cluster of VMs, which was mapped from security group information obtained from centralized network controller 32. Address group 349 may maintain the address group information, such as dynamic membership criteria for a cluster of VMs, received from security management system 34.

In some examples, security management system 34 may provide security policies that specify attack definitions 333, which, in some example approaches, security management client 344 relays to policy engine 328. In some examples, attack definitions 333 may be known vulnerabilities, such as attack information from National Vulnerability Database (NVD); SysAdmin, Audit, Network, Security institute (SANS); Common Vulnerabilities and Exposures (CVE); BugTraq; CERT coordination center; Packet Storm Security; Metsploit; French Security Incident Response Team (FrSIRT); Internet Security Systems (ISS), and others. Security management client 344 may receive the aforementioned information from security management system 34 via configuration interface 345 for storage within policies 347, and relays the information to the policy engine 328 for application to packet flows.

Flow analysis module 325 receives inbound traffic 324 and performs flow-based processing. Flow analysis module 325 identifies individual network flows within the traffic, such as a source address, a destination address, and communication protocol. Flow analysis module 325 may utilize additional information to specify network flows, including source media access control ("MAC") address, destination MAC address, source port, and destination port. Other examples may use other information to identify network flows, such as IP addresses, application sessions, and bandwidth usage. Although not shown, flow analysis module 345 may perform additional tasks, such as logging each packet flow for further inspection.

Policy engine 328 may determine, among other things, whether the packet is allowed into the device and which security policies to apply to the packet. For example, policy engine 328 determines a security policy from a list of security policies that permits or denies traffic flowing through perimeter firewall 300. Policy engine 328 may apply a security policy received from security management system 34 that uses address group information 350 that identifies a cluster of VMs for which the security policies are to be applied. Address group information 350 is generated in accordance with address group information 349.

In the event a security risk is detected, policy engine 328 may drop the packets, close a communication session, or other action to prevent the traffic (and subsequent traffic) from being forwarded to the cluster of VMs. In some examples, policy engine 328 may output an alert 340 to security management client 344 for logging and further analysis. If no security risk is detected, forwarding component 331 continues to forward the packet flows between the peers, i.e., forward the packet toward the cluster of VMs. Forwarding component 331 may, for example, maintain a routing table that stores routes in accordance with a topology of the enterprise network for use in forwarding the packet flows. Although FIG. 3 is described with respect to a firewall, the techniques described are equally applicable to Intrusion Detection Systems (IDS) and Intrusion Prevention Systems (IPS) as described in U.S. Pat. No. 9,106,693, entitled "ATTACK DETECTION AND PREVENTION USING GLOBAL DEVICE FINGERPRINTING," and U.S. Pat. No. 10,135,841, entitled "INTEGRATED SECURITY SYSTEM HAVING THREAT VISUALIZATION AND AUTOMATED SECURITY DEVICE CONTROL," the entire contents of both of which are incorporated by reference herein.

Figure 4:
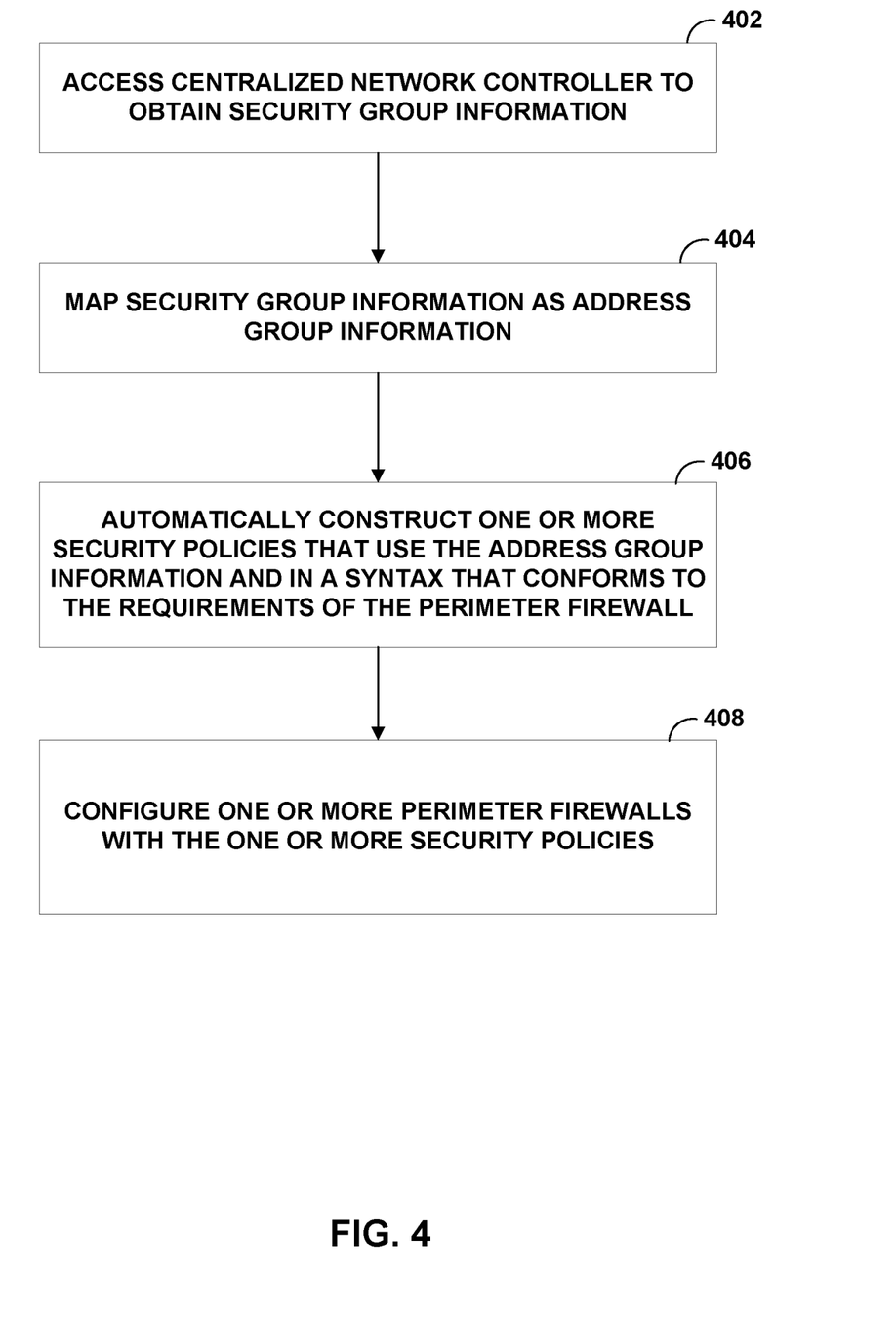
FIG. 4 is a flowchart illustrating an example operation in accordance with the techniques of the disclosure.

FIG. 4 is a flowchart illustrating an example operation in accordance with the techniques of the disclosure. For convenience, FIG. 4 is described with respect to FIGS. 1 and 2. In the example of FIG. 4, security management system 34 accesses centralized network controller 32 to obtain security group information for a virtual firewall of the software defined network (402). For example, security management system 34 may initiate communication with CNC 32 to enable bidirectional communication between security management system 34 and CNC 32 for exchanging information, e.g., security group information. Firewall configuration module 57 of security management system 34 may use SSL to communicate on a TCP port with CNC 32. CNC 32 may synchronize shared objects, e.g., security group information, and addresses with security management system 34.

Security management system 34 maps security group information as address group information (404). For example, address group information may be stored in a container, e.g., address group 53 of FIG. 2, for a list of network addresses propagated from an external data feed, e.g., CNC 32, and may be used by a security policy. For example, in response to obtaining the security group information from CNC 32, firewall configuration module 57 of security management system 34 may map the dynamic membership criteria from security group information to an address group.

Security management system 34 automatically constructs one or more security policies that use the address group information and in a syntax that conforms to the requirements of the perimeter firewall (406). For example, using the address group information, security management system 34 may configure one or more rules for traffic ingressing into data center 10 and destined for one or more VMs associated with the address group, and/or for traffic egressing from the one or more VMs associated with the address group and egressing data center 10. More specifically, for traffic ingressing data center 10 and destined for the cluster of VMs identified from the security group information, policy module 50 of security management system 34 may generate a security policy and configure, for example, a destination address field of the security policy to use an entry of the address group 53 that identifies the cluster of VMs. For traffic egressing data center 10 and sourced from the cluster of VMs identified from the security group information, policy module 50 may configure, for example, a source address field of a security policy to use an entry of the address group 53 that identifies the cluster of VMs.

Security management system 34 configures one or more perimeter firewalls with the one or more security policies based on the security group information (408). For example, security management system 34 may push the one or more configured security policies to perimeter firewall 35 such that perimeter firewall 35 may apply the security policies at the perimeter level of data center 10. Security management system 34 may use one or more network management protocols designed for management of configuration information data within managed perimeter firewall 35, such as the SNMP or NETCONF, or a derivative thereof, such as the Juniper Device Management Interface, to manage the security policies within perimeter firewall 35.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
    accessing, with a security management system provided by a first entity of a data center, a centralized network controller provided by a second entity of the data center for a software defined network within the data center to obtain security group information for a virtual firewall of the software defined network,
        wherein the security group information specifies a cluster of virtual machines of the software defined network that is protected by the virtual firewall that provides network security for traffic flowing between applications executing on the cluster of virtual machines, and
        wherein the centralized network controller configures the security group information in a syntax that conforms to requirements of the virtual firewall; and
    automatically configuring, with the security management system, a perimeter firewall positioned on the edge of the data center with one or more security policies based on the security group information from the virtual firewall of the software defined network, wherein the perimeter firewall provides network security for traffic flowing between the software defined network and devices external to the data center,
        wherein automatically configuring the perimeter firewall comprises automatically constructing the one or more security policies using address group information translated from the security group information, and
        wherein the security management system configures the address group information in a syntax that conforms to the requirements of the perimeter firewall.

2. The method of claim 1, wherein accessing the centralized network controller of the software defined network comprises:
    receiving, by the security management system of the first entity and from the centralized network controller of the second entity, dynamic membership criteria associated with the cluster of virtual machines; and
    mapping, by the security management system, the dynamic membership criteria associated with the cluster of virtual machines to the address group information.

3. The method of claim 2, wherein the dynamic membership criteria comprises at least one of a security tag, a VM name, and a logical switch name.

4. The method of claim 1, further comprising:
    in response to a change in the security group information, updating, by the security management system, the address group information based on the change in the security group information.

5. The method of claim 1,
    wherein the virtual firewall is a distributed firewall implemented across a plurality of servers of the data center.

6. A security management system provided by a first entity of a data center configured to:
    access a centralized network controller provided by a second entity of the data center for a software defined network within the data center to obtain security group information for a virtual firewall of the software defined network,
        wherein the security group information specifies a cluster of virtual machines of the software defined network that is protected by the virtual firewall that provides network security for traffic flowing between applications executing on the cluster of virtual machines, and
        wherein the centralized network controller configures the security group information in a syntax that conforms to requirements of the virtual firewall; and
    automatically configure, with the security management system, a perimeter firewall positioned on the edge of the data center with one or more security policies based on the security group information from the virtual firewall of the software defined network, wherein the perimeter firewall provides network security for traffic flowing between the software defined network and devices external to the data center,
  wherein automatically configuring the perimeter firewall comprises automatically constructing the one or more security policies using address group information translated from the security group information, and
  wherein the security management system configures the address group information in a syntax that conforms to the requirements of the perimeter firewall.

7. The security management system of claim 6, wherein, to access the centralized network controller, the security management system is further configured to:
  receive, from the centralized network controller of the second entity, dynamic membership criteria associated with the cluster of virtual machines; and
  map the dynamic membership criteria associated with the cluster of virtual machines to the address group information.

8. The security management system of claim 7, wherein the dynamic membership criteria comprises at least one of a security tag, a VM name, and a logical switch name.

9. The security management system of claim 6, wherein the security management system is further configured to:
  update, in response to a change in the security group information, the address group information based on the change in the security group information.

10. The security management system of claim 6,
  wherein the virtual firewall is a distributed firewall implemented across a plurality of servers of the data center.

11. A non-transitory computer-readable medium that comprises instructions that, when executed, cause one or more processors of a data center executing a Security Management System (SMS) provided by a first entity of the data center to:
  access a centralized network controller provided by a second entity of the data center for a software defined network within the data center to obtain security group information for a virtual firewall of the software defined network, wherein the security group information specifies a cluster of virtual machines of the software defined network that is protected by the virtual firewall that provides network security for traffic flowing between applications executing on the cluster of virtual machines,
    wherein the centralized network controller configures the security group information in a syntax that conforms to requirements of the virtual firewall; and
  automatically configuring, with the security management system, a perimeter firewall positioned on the edge of the data center with one or more security policies based on the security group information from the virtual firewall of the software defined network, wherein the perimeter firewall provides network security for traffic flowing between the software defined network and devices external to the data center,
    wherein automatically configuring the perimeter firewall comprises automatically constructing the one or more security policies using address group information translated from the security group information, and
    wherein the security management system configures the address group information in a syntax that conforms to the requirements of the perimeter firewall.

12. The computer-readable medium of claim 11, wherein, to access the centralized network controller of the software defined network, the instructions further cause the one or more processors to:
  receive, from the centralized network controller of the second entity, dynamic membership criteria associated with the cluster of virtual machines; and
  map the dynamic membership criteria associated with the cluster of virtual machines to the address group information.

13. The computer-readable medium of claim 12, wherein the dynamic membership criteria comprises at least one of a security tag, a VM name, and a logical switch name.

14. The computer-readable medium of claim 11, wherein the instructions further cause the one or more processors to:
  update, in response to a change in the security group information, the address group information based on the change in the security group information.

15. The computer-readable medium of claim 11,
  wherein the virtual firewall is a distributed firewall implemented across a plurality of servers of the data center.

* * * * *